US012603226B2

(12) United States Patent (10) Patent No.: US 12,603,226 B2
Jung et al. (45) Date of Patent: Apr. 14, 2026

(54) MULTILAYERED CAPACITOR

(71) Applicant: SAMSUNG ELECTRO-MECHANICS CO., LTD., Suwon-si (KR)

(72) Inventors: Sun-Min Jung, Suwon-si (KR); Byungsung Kang, Suwon-si (KR); Youngho Son, Suwon-si (KR); Min-Hoe Kim, Suwon-si (KR); Yun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 337 days.

(21) Appl. No.: 18/144,805

(22) Filed: May 8, 2023

(65) Prior Publication Data

US 2023/0377801 A1 Nov. 23, 2023

(30) Foreign Application Priority Data

May 18, 2022 (KR) ......................... 10-2022-0060985
Jul. 7, 2022 (KR) ......................... 10-2022-0083989
Dec. 28, 2022 (KR) ......................... 10-2022-0186948

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/1227* (2013.01)

(58) Field of Classification Search
CPC ......... H01G 4/008; H01G 4/1209; H01G 4/30
See application file for complete search history.

(56) References Cited

U.S. PATENT DOCUMENTS

| | | | |
|---|---|---|---|
| 2010/0014210 A1 | 1/2010 | Nakamura et al. | |
| 2017/0025222 A1 | 1/2017 | Park et al. | |
| 2018/0218837 A1 | 8/2018 | Hirose et al. | |
| 2018/0222801 A1* | 8/2018 | Hirose ................. | C04B 35/462 |

(Continued)

FOREIGN PATENT DOCUMENTS

| | | |
|---|---|---|
| JP | 4831142 B2 | 12/2011 |
| JP | 2022-023548 A | 2/2022 |

(Continued)

OTHER PUBLICATIONS

Extended European Search Report dated Oct. 13, 2023 issued in European Patent Application No. 23173856.8.

(Continued)

*Primary Examiner* — Nathan Milakovich
(74) *Attorney, Agent, or Firm* — Morgan, Lewis & Bockius LLP

(57) ABSTRACT

A multilayered capacitor including a capacitor body including a dielectric layer and internal electrodes, and an external electrode outside the capacitor body, wherein the dielectric layer includes a plurality of dielectric grains, at least one of the plurality of dielectric grains has a multicore-shell structure, and the dielectric grains having the multicore-shell structure include two or more dielectric cores and shells surrounding at least some of the cores.

19 Claims, 13 Drawing Sheets

(56)　　　　　　　References Cited

U.S. PATENT DOCUMENTS

| | | | |
|---|---|---|---|
| 2018/0261755 A1* | 9/2018 | Kitazaki | ............ H10N 30/8561 |
| 2021/0249192 A1 | 8/2021 | Kang et al. | |
| 2022/0028611 A1 | 1/2022 | Iguchi | |

FOREIGN PATENT DOCUMENTS

| | | |
|---|---|---|
| KR | 10-2018-0027583 A | 3/2018 |
| KR | 10-2021-0100952 A | 8/2021 |

OTHER PUBLICATIONS

Office Action dated Feb. 4, 2026 in corresponding Korean Patent Application No. 10-2022-0186948 with English translation.

* cited by examiner

MULTILAYERED CAPACITOR

CROSS-REFERENCE TO RELATED APPLICATIONS

This application claims priority to and the benefit of Korean Patent Application No. 10-2022-0083989 filed in the Korean Intellectual Property Office on Jul. 7, 2022, Korean Patent Application No. 10-2022-0060985 filed in the Korean Intellectual Property Office on May 18, 2022, and Korean Patent Application No. 10-2022-0186948 filed in the Korean Intellectual Property Office on Dec. 28, 2022, the entire contents of which are incorporated herein by reference.

BACKGROUND

(a) Technical Field

The present disclosure relates to a multilayered capacitor.

(b) Description of the Related Art

Multi-layer ceramic capacitors (MLCC) have a competitive edge by securing reliability under severe conditions along with technological developments due to down-sizing, integration, and complexity of electronic devices.

In accordance with this trend, high-reliability products thereof are designed in a direction of reducing a grain size of barium titanate ($BaTiO_3$) of a dielectric base material to increase a withstand voltage, increasing an amount of a rare earth element as an additive to the dielectric material, increasing smoothness of an internal electrode, and reducing a size of the dielectric barium titanate base material to increase a voltage applied per grain.

However, more research is needed to determine a relationship among initial local defects, microstructures, and electrical characteristics.

SUMMARY

One aspect of the present disclosure provides a multilayered capacitor that increases a specific resistance by increasing a ratio of a shell having a high specific resistance component in the dielectric grains of the core-shell structure, thereby preventing IR degradation even under harsh conditions, and compensating for a decrease in dielectric constant even when grains are atomized to satisfy a capacity.

A multilayered capacitor according to one aspect includes a capacitor body including a dielectric layer and internal electrodes, and an external electrode outside the capacitor body, wherein the dielectric layer includes a plurality of dielectric grains, at least one of the plurality of dielectric grains has a multicore-shell structure, while the dielectric grain having the multicore-shell structure includes two or more cores and a shell surrounding at least some of the cores.

The dielectric grain having the multicore-shell structure may include 2 to 5 cores.

An average area of dielectric grains having the multicore-shell structure per 0.5 μm×0.5 μm area of the dielectric layer may be about 5% to about 100%.

The average number of dielectric grains having the multicore-shell structure per 0.5 μm×0.5 μm area of the dielectric layer may be 1 to 10.

A ratio of an average diameter of one core included in the dielectric grain having the multicore-shell structure to an average diameter of the dielectric grain having the multicore-shell structure may be about 5% to about 50%.

A ratio of an average area of the shell included in the dielectric grain having the multicore-shell structure to a total average area of the dielectric grain having the multicore-shell structure may be about 50% to about 95%.

A ratio of a sum of average areas of the cores included in dielectric grains having the multicore-shell structure to a total average area of the dielectric grains having the multicore-shell structure may be about 5% to about 30%.

In dielectric grains having a multicore-shell structure, a ratio of a sum of average areas of the cores to an average area of the shell may be about 0.5:9.5 to about 5:5.

At least one of the plurality of dielectric grains may have a single core-shell structure, and the dielectric grain having the single core-shell structure may include one core and a shell surrounding at least a portion of the core.

An average diameter of dielectric grains having a single core-shell structure may be about 100 nm to about 1000 nm.

An average diameter of the core included in dielectric grains having a single core-shell structure may be about 50 nm to about 500 nm.

An average diameter of dielectric grains having a multi-core-shell structure may be about 100 nm to about 1000 nm.

An average diameter of one core included in dielectric grains having a multicore-shell structure may be about 50 nm to about 300 nm.

A ratio of an average diameter of the core included in dielectric grains having the single core-shell structure to an average diameter of the dielectric grains having the single core-shell structure may be about 30% to about 80%.

A ratio of an average area of the shell included in dielectric grains having the single core-shell structure to a total average area of dielectric grains having the single core-shell structure may be about 20% to about 70%.

The dielectric grains may include a main component including a dielectric material and a subcomponent.

The cores and shell may have different molar ratios of the main component and the subcomponent.

The cores may include less than or equal to about 0.1 parts by mole of the subcomponent relative to 100.0 parts by mole of the main component.

The shell may include greater than about 0.1 parts by mole and less than or equal to about 30.0 parts by mole of the subcomponent relative to 100.0 parts by mole of the main component.

The main component may include $Ba_mTiO_3$ (0.995≤m≤1.010), $(Ba_{1-x}Ca_x)_m(Ti_{1-y}Zr_y)O_3$ (0.995≤m≤1.010, 0≤x≤0.10, 0<y≤0.20), $Ba_m(Ti_{1-x}Zr_x)O_3$ (0.995≤m≤1.010, 0≤x≤0.10), $(Ba_{1-x}Ca_x)_m(Ti_{1-y}Sn_y)O_3$ (0.995≤m≤0≤x≤0.10, 0<y≤0.20), or a combination thereof.

The subcomponent may include manganese (Mn), chromium (Cr), barium (Ba), silicon (Si), aluminum (Al), magnesium (Mg), zirconium (Zr), or a combination thereof.

The subcomponent may further include lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or a combination thereof.

A ratio of an average diameter of one core included in the dielectric grain having the multicore-shell structure to an average diameter of the dielectric grain having the multicore-shell structure may be about 12.8% to about 46.6%.

According to one aspect, by increasing the ratio of the shell having a high specific resistance component in the dielectric grains of the core-shell structure to increase the specific resistance, IR degradation may be prevented even under severe conditions, and capacity may be satisfied by compensating for a decrease of a dielectric constant even when grains are atomized.

BRIEF DESCRIPTION OF THE DRAWINGS

FIG. 3 is an exploded perspective view illustrating a stacked structure of internal electrode layers in the capacitor body of FIG. 1.

FIGS. 7A-7F show the final grain shape and component analysis results according to the size of raw BT powder, FIG. 7A is a HAADF image of BT1, FIG. 7B is an EDS mapping of Dy of BT1, FIG. 7C is an EDS mapping of Si of BT1, FIG. 7D is a HAADF image of BT3, FIG. 7E is an EDS mapping of Dy of BT3, and FIG. 7F is an EDS mapping of Si of BT3.

DETAILED DESCRIPTION

Figure 1:
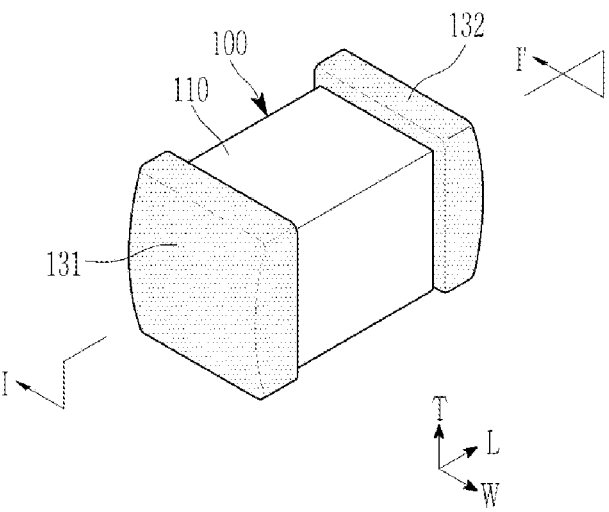
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
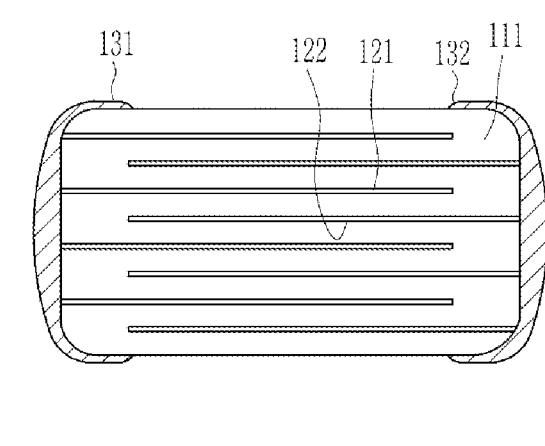
FIG. 2 is a cross-sectional view of the multilayered capacitor taken along line I-I' of FIG. 1.
Figure 3:
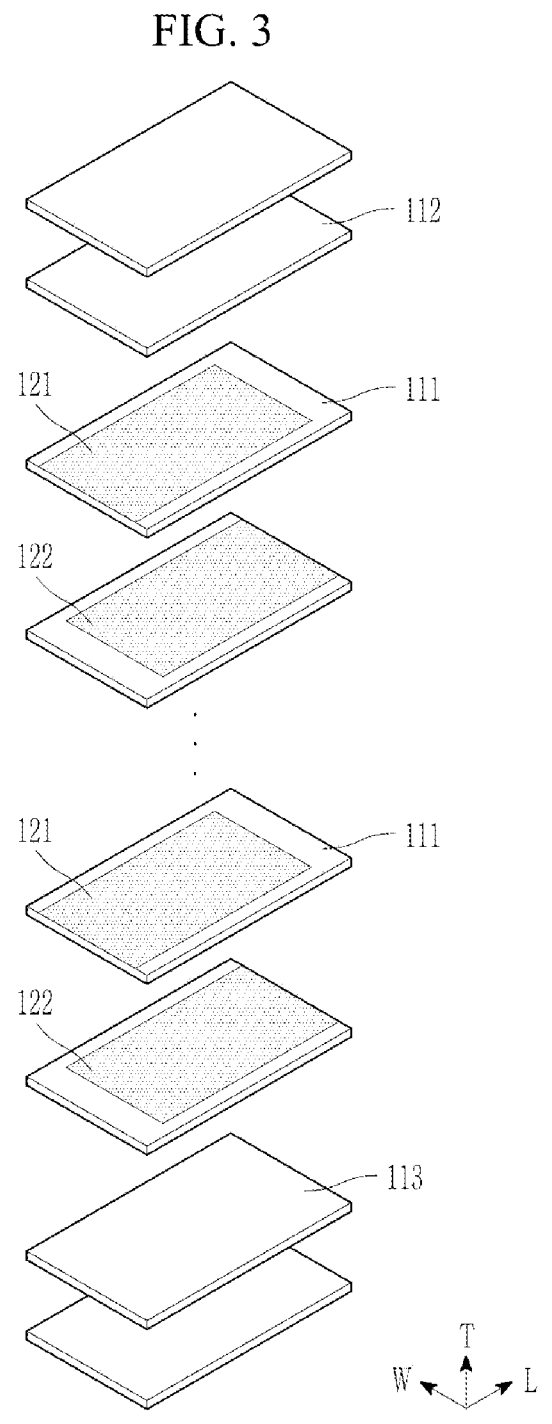

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrode layers in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first external electrode 131 and the second external electrode 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and a first external electrode 131 and a second external electrode 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as a first surface and a second surface, surfaces connected to the first surface and the second surface and facing each other in the longitudinal direction (L-axis direction) are defined as a third surface and a fourth surface, and surfaces connected to the first surface and the second surface, connected to the third surface and the fourth surface, and facing each other in the width direction (W-axis direction) are defined as a fifth surface and a sixth surface. The first surface, which is the lower surface, may be a surface facing the mounting substrate.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the T direction and then sintering them, and includes a plurality of dielectric layers 111, and the first internal electrode layer 121 and the second internal electrode layer 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first internal electrode layer 121 or the second internal electrode layer 122 are stacked and overlapped with each other along the thickness direction (T-axis direction).

The cover regions 112 and 113 may be respectively disposed on the first surface and the second surface of the active region in the thickness direction (T-axis direction) as margin portions in the thickness direction. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion in the width direction, and may be respectively disposed on the fifth surface and the sixth surface of the active region in the width direction (W-axis direction). Such a side cover region may be formed by applying a conductive paste layer for forming internal electrode layers on the surface of the dielectric green sheet only to a portion of the surface of the dielectric green sheet, stacking dielectric green sheets to which a conductive paste layer is not applied on both side surfaces of the dielectric green sheet, and sintering the same.

The cover regions 112 and 113 and the side cover regions serve to prevent damage to the first internal electrode layer 121 and the second internal electrode layer 122 due to physical or chemical stress.

Figure 4:
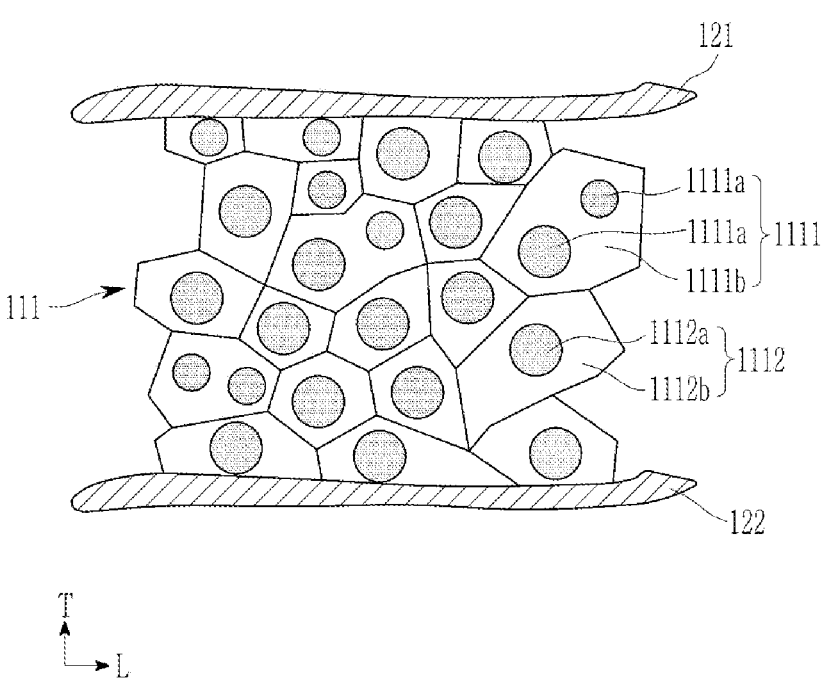
FIG. 4 is an enlarged cross-sectional view showing a dielectric layer in FIG. 2.

FIG. 4 is an enlarged cross-sectional view of the dielectric layer 111 in FIG. 2. Hereinafter, the dielectric layer 111 will be described in detail with reference to FIG. 4.

The dielectric layer 111 includes a plurality of dielectric grains 1111 and 1112.

At least one of the plurality of dielectric grains 1111 and 1112 is a dielectric grain 1111 having a multicore-shell structure.

The dielectric grain 1111 having a multicore-shell structure includes two or more dielectric cores 1111a in one dielectric grain 1111 and a shell 1111b surrounding at least a portion of the cores 1111a.

In order to develop a high-reliability multilayer capacitor 100 that shows stable performance even under severe operating conditions (e.g., high voltage and high temperature), an additive for improving temperature characteristics is added to a dielectric material, for example, barium titanate (BaTiO$_3$), so that the dielectric grains 1112 having a core-shell structure are formed.

In addition, in order to increase a withstand voltage of the multilayered capacitor 100, a voltage applied per dielectric grain 1112 is increased by reducing the size of the dielectric material. However, when the dielectric material is atomized, the size of the dielectric grains 1112 produced under general sintering conditions also decreases, thereby reducing the dielectric constant and the capacitance.

However, when the dielectric layer 111 includes dielectric grains 1111 having a multicore-shell structure, even if the dielectric material is atomized, the size of the dielectric grains 1111 is similar to that of a conventional dielectric material that is not atomized, but high reliability of the multilayered capacitor 100 may be secured.

That is, when the dielectric layer 111 includes dielectric grains 1111 having a multicore-shell structure, a ratio of the core 1111a in the dielectric grains 1111 is relatively increased to compensate for the decrease in a dielectric constant while maintaining the size of the dielectric grains 1111 as before to satisfy the capacitance, and IR degradation may be prevented even under severe conditions, by increasing the ratio of the shell 1111b having a high specific resistance component to increase the specific resistance.

The dielectric grains 1111 and 1112 include a main component and a subcomponent.

The main component may include a dielectric material including Ba$_m$TiO$_3$ (0.995≤m≤1.010), (Ba$_{1-x}$Ca$_x$)$_m$(Ti$_{1-y}$Zr$_y$)O$_3$ (0.995≤m≤1.010, 0≤x≤0.10, 0<y≤0.20), Ba$_m$(Ti$_{1-x}$Zr$_x$)O$_3$ (0.995≤m≤1.010, x≤0.10), (Ba$_{1-x}$Ca$_x$)$_m$(Ti$_{1-y}$Sn$_y$)O$_3$ (0.995≤m≤1.010, 0≤x≤0.10, 0<y≤0.20), or a combination thereof.

The subcomponent may include manganese (Mn), chromium (Cr), barium (Ba), silicon (Si), aluminum (Al), magnesium (Mg), zirconium (Zr), or a combination thereof.

In addition, the subcomponent may further include lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or a combination thereof.

The cores 1111a and 1112a and the shells 1111b and 1112b have different molar ratios of the main component and the subcomponent, that is, the molar ratio of the main component and the subcomponent may change drastically. Accordingly, it is possible to easily distinguish the boundary between the cores 1111a and 1112a and the shells 1111b and 1112b, which can be confirmed through TEM-EDS analysis. Other methods and/or tools appreciated by one of ordinary skill in the art, even if not described in the present disclosure, may also be used.

For example, a line analysis with an EDS (energy dispersive X-ray spectrometer) installed in a transmission electron microscope (TEM) may be performed on the cross-section cut in an L-axis direction and a T-axis direction from the center of a W-axis direction of the capacitor body 110, and the dielectric grains 1111 and 1112 of the dielectric layer 111 in the middle of the L-axis direction and the T-axis direction, wherein when the analysis is performed from the center of the dielectric grains 1111 and 1112 to the outside of the dielectric grains 1111 and 1112, a boundary distinguishing the cores 1111a and 1112a and the shells 1111b and 1112b may be set where a concentration of at least one of the subcomponents, for example, silicon (Si), sharply starts to increase to count the number of the cores 1111a and 1112a in the dielectric grains 1111 and 1112.

For example, the cores 1111a and 1112a include less than or equal to about 0.1 parts by mole of the subcomponent relative to about 100.0 parts by mole of the main component, and the shells 1111b and 1112b may include greater than about 0.1 parts by mole and less than or equal to about 30.0 parts by mole of the subcomponent, based on about 100.0 parts by mole of the main component. When the cores 1111a and 1112a include greater than about 0.1 parts by mole of the subcomponent based on about 100.0 parts by mole of the main component, material properties of pure BaTiO₃ may be changed, but when the shells 1111b and 1112b include less than or equal to about 0.1 parts by mole of the subcomponent based on about 100.0 parts by mole of the main component, a dielectric constant according to a temperature may be changed within a larger range, and when the subcomponent is included in an amount of greater than about 30.0 parts by mole, initial insulation resistance may be lowered. As used herein, numerical values relating to measurements may be subject to measurement errors which may place limits on the accuracy of the values. The maximum margin may be ascertained by applying the rounding-off convention. In this regard, the maximum margin for "about 0.1" may be 0.96 to 1.04. The maximum margin for "about 5%" may be 4.5% to 5.4%.

In other words, in the cores 1111a and 1112a, the subcomponent may not be present, or if any, present in a trace amount. Accordingly, the cores 1111a and 1112a may be formed of the pure main component alone without impurities, wherein the pure main component may in general have a higher dielectric constant than a main component doped with impurity elements. Accordingly, the cores 1111a and 1112a may serve to maintain the dielectric constant.

The shells 1111b and 1112b include more subcomponents than the cores 1111a and 1112a. In the shells 1111b and 1112b, a subcomponent doped at a B-site of the main component (perovskite ABO₃ structure) has an effect of increasing bandgap energy at which other rare earth elements and doping elements are diffused into the dielectric grains 1111 and 1112. Accordingly, this subcomponent may serve as a barrier to suppress the diffusion of the other rare earth elements and doping elements into the dielectric grains 1111 and 1112. The shells 1111b and 1112b serve to suppress growth of the dielectric grains 1111 and 1112, contributing to atomizing the dielectric grains 1111 and 1112. In addition, in the shells 1111b and 1112b, a subcomponent doped in an A-site of the main component may serve to improve reliability and a dielectric constant.

The dielectric grain 1111 having a multicore-shell structure may include about 2 to about 5 dielectric cores 1111a, for example, about 2 to about 4 dielectric cores 1111a, or about 2 to about 3 dielectric cores 1111a. When the dielectric grain 1111 having a multicore-shell structure includes less than about 2 dielectric cores 1111a, reliability may be difficult to improve, and when greater than about 5 dielectric cores 1111a are included, a capacity variation rate according to a temperature may be increased.

An average diameter of the dielectric grains 1111 and 1112, an average diameter of the cores 1111a and 1112a, an average area of the dielectric grains 1111 and 1112, an average area of the cores 1111a and 1112a, and an average area of the shells 1111b and 1112b, which are illustrated hereinafter, are measured in the following method.

The L-axis direction surface and the T-axis direction surface (fifth surface or sixth surface) of the capacitor body 110 are polished in the W-axis direction, until the dielectric layer 111 is exposed, for example, to about half thereof, to expose the L-axis direction and T-axis direction cross-sections, any dielectric layer 111 is elected from the L-axis direction and T-axis direction cross-section, and a region with a size of 0.5 μm×0.5 μm (unit area) in an active region is taken as a measurement object. Or, the L-axis direction surface and the W-axis direction surface (first surface or second surface) of the capacitor body 110, until the dielectric layer 111 is exposed, for example, to about half thereof, is polished in the T-axis direction, to expose the dielectric layer 111 on the L-axis direction and the W-axis direction cross-sections and a region with a size of 0.5 μm×0.5 μm (unit area) in an active region is taken as a measurement object. However, the unit area should be set as a region including at least one dielectric grain having a multicore-shell structure.

The measurement object is measured with respect to a diameter of the dielectric grains 1111 and 1112 and an area of the dielectric grains 1111 and 1112 by using a transmission electron microscope (TEM) under the conditions of an acceleration voltage of about 200 kV and WD of 115 mm. Herein, the diameter of the dielectric grains 1111 and 1112 may be calculated as an average value of the shortest axis among short axes perpendicular to the longest axis, and the area of the dielectric grains 1111 and 1112 may be calculated by assuming that the dielectric grains 1111 and 1112 are circular and using the diameter.

In addition, the measurement object is measured with respect to a composition and an element distribution of the dielectric grains 1111 and 1112 by using an EDS (energy dispersive X-ray spectrometer) installed in a transmission electron microscope (TEM) under the conditions of an acceleration voltage of 200 kV, WD of 115 mm, and mapping scan (dwell time) of 30 μs to distinguish the cores 1111a and 1112a from the shells 1111b and 1112b, and then a diameter of the cores 1111a and 1112a, an area of the cores 1111a and 1112a, and an area of the shells 1111b and 1112b are measured. Herein, the diameter of the cores 1111a and 1112a may be calculated by averaging a long axis and a short axis perpendicular thereto, the area of the cores 1111a and 1112a may be calculated by assuming that the cores 1111a and 1112a are circular and using the diameter, and the area of the shells 1111b and 1112b may be obtained by excluding the area of the cores 1111a and 1112a from the area of the dielectric grains 1111 and 1112.

In addition, each average value of the diameter of the dielectric grains 1111 and 1112, the diameter of the cores 1111a and 1112a, the area of the dielectric grains 1111 and 1112, the area of the cores 1111a and 1112a, and the area of the shells 1111b and 1112b may be an arithmetic mean value of three measurements on three different dielectric layers 111 on the L-axis direction and the T-axis direction cross-section or an arithmetic mean value of a total of 9 measurements at a center, one end, and the other end of each active region in the three different dielectric layers 111 on the L-axis direction and T-axis direction cross-sections. Other methods and/or tools appreciated by one of ordinary skill in the art, even if not described in the present disclosure, may also be used.

An average area of dielectric grains 1111 having a multicore-shell structure per unit area (0.5 μm×0.5 μm) of the dielectric layer 111 may be greater than or equal to about 5%, for example greater than or equal to about 15%, greater than or equal to about 25%, greater than or equal to about 50%, greater than or equal to about 60%, greater than or equal to about 70%, greater than or equal to about 80%, greater than or equal to about 90%, or greater than or equal to about 100%, and less than or equal to about 100%, for example less than or equal to about 90%, less than or equal to about 80%, less than or equal to about 70%, less than or equal to about 60%, less than or equal to about 50%, less than or equal to about 25%, or less than or equal to about 15%, or about 5% to about 100%, for example about 15% to about 100%, about 25% to about 100%, or about 25% to about 90%. When the dielectric grain 1111 having the multicore-shell structure has an average area of greater than or equal to about 100%, the average area of the dielectric grain 1111 having the multicore-shell structure is larger than the unit area (0.5 μm×0.5 μm), wherein the average area of the dielectric grain 1111 having the multicore-shell structure may be greater than or equal to about 100% of the unit area (0.5 μm×0.5 μm), for example greater than or equal to about 110%, greater than or equal to about 120%, greater than or equal to about 130%, greater than or equal to about 140%, greater than or equal to about 150%, greater than or equal to about 160%, greater than or equal to about 170%, greater than or equal to about 180%, greater than or equal to about 190%, or greater than or equal to about 200%. When the average area of the dielectric grain 1111 having the multicore-shell structure is less than about 5%, the effect of improving reliability may be difficult to measure. Each numerical value of the area may be obtained by processing the electron micrographs with an image processing program. Other methods and/or tools appreciated by one of ordinary skill in the art, even if not described in the present disclosure, may also be used.

The average number of the dielectric grain 1111 having the multicore-shell structure per unit area (0.5 μm×0.5 μm) of the dielectric layer 111 may be about 1 to about 10, for example about 1 to about 7, about 1 to about 5, or about 1 to about 3. When the average number of the dielectric grain 1111 having the multicore-shell structure is less than about 1, the effect of improving reliability may be difficult to measure.

A ratio of the average diameter of one core 1111a included in the dielectric grain 1111 having the multicore-shell structure to that of the dielectric grain 1111 having the multicore-shell structure may be about 5% to about 50%, for example about 12.8% to about 46.6%. When the diameter ratio of one core 1111a included in the dielectric grain 1111 having the multicore-shell structure is greater than about 46.6%, a dielectric constant variation rate according to a temperature may increase.

An average area ratio of the shell 1111b included in the dielectric grain 1111 having the multicore-shell structure to the entire average area of the dielectric grain 1111 having the multicore-shell structure may be about 50% to about 95%, for example about 70% to about 92%. When the average area ratio of the shell 1111b included in the dielectric grain 1111 having the multicore-shell structure is greater than about 95%, a dielectric constant variation rate according to a temperature may increase.

A ratio of a sum of the average area of the cores 1111a included in the dielectric grain 1111 having the multicore-shell structure to the total average area of the dielectric grain 1111 having the multicore-shell structure may be about 5% to about 30%, for example about 8% to about 24%. Herein, the average area of the cores 1111a is a sum of the average areas of the cores 1111a that the dielectric grain 1111 having the multicore-shell structure includes. For example, when the dielectric grain 1111 having the multicore-shell structure includes two cores 1111a, the average area of the core 1111a may be a sum of the average areas of two cores 1111a. When the ratio of the sum of the average area of the cores 1111a included in the dielectric grain 1111 having the multicore-shell structure is greater than about 30%, a dielectric constant variation rate according to a temperature may increase.

An average area ratio of the cores 1111a and the shell 1111b in the dielectric grain 1111 having a multicore-shell structure may be about 0.5:9.5 to about 5:5, for example, about 1:9 to about 4:6. When the area ratio of the shell 1111b in the dielectric grains 1111 having the multicore-shell structure exceeds 9, a dielectric constant variation rate according to temperature may increase. On the other hand, at least one of the plurality of dielectric grains 1111 and 1112 is the dielectric grain 1112 having a single core-shell structure.

The dielectric grains 1112 having the single core-shell structure includes one dielectric core 1112a and a shell 1112b surrounding at least a portion of the core 1112a.

The dielectric grain 1112 having the single core-shell structure has an average diameter of about 100 nm to about 1000 nm, and one core 1112a included in the dielectric grain 1112 having the single core-shell structure may have an average diameter of about 50 nm to about 500 nm.

On the other hand, the dielectric grain 1111 having the multicore-shell structure 1111 may have an average diameter of about 100 nm to about 1000 nm, but one core 1111a included in the dielectric grain 1111 having the multicore-shell structure may have an average diameter of about 50 nm to about 300 nm.

In addition, a ratio of the average diameter of one core 1112a included in the dielectric grain 1112 having the single core-shell structure to that of the dielectric grain 1112 having the single core-shell structure may be about 30% to about 80%, for example about 36% to about 78%.

In addition, a ratio of the average area of the shell 1112b included in the dielectric grains 1112 having the single core-shell structure to the total average area of the dielectric grain 1112 having the single core-shell structure may be about 20% to about 70%, for example about 30% to about 70%.

In other words, when the dielectric layer 111 includes the dielectric grain 1111 having the multicore-shell structure, compared with when the dielectric grain 1112 having the single core-shell structure alone is included, even if the dielectric material is atomized, the dielectric grain 1111 has a similar size to that of a conventional non-atomized dielectric material but may secure a dielectric constant and increase a ratio of the shell 1111b by including the cores 1111a in one dielectric grain 1111.

For example, an average thickness of the dielectric layer 111 may be about 0.5 μm to about 10 μm.

The first internal electrode layer 121 and the second internal electrode layer 122 are electrodes having different polarities, and are alternately disposed to face each other along the T-axis direction with the dielectric layer 111 interposed therebetween, and one end thereof may be exposed through the third and fourth surfaces of the capacitor body 110.

The first internal electrode layer 121 and the second internal electrode layer 122 may be electrically insulated from each other by the dielectric layer 111 disposed in the middle.

Ends of the first and second internal electrodes layers 121 and 122 alternately exposed through the third and fourth surfaces of the capacitor body 110 are connected to the first external electrode 131 and the second external electrode 132, respectively, to be electrically connected.

The first internal electrode layer 121 and the second internal electrode layer 122 may include a conductive metal, for example, a metal such as Ni, Cu, Ag, Pd, or Au, or an alloy thereof, for example, a Ag—Pd alloy.

Also, the first internal electrode layer 121 and the second internal electrode layer 122 may include dielectric particles having the same composition as the ceramic material included in the dielectric layer 111.

The first internal electrode layer 121 and the second internal electrode layer 122 may be formed using a conductive paste containing a conductive metal. As a method of printing the conductive paste, a screen-printing method or a gravure printing method or the like may be used.

For example, each average thickness of the first internal electrode layer 121 and the second internal electrode layer 122 may be about 0.1 μm to about 2 μm.

The first external electrode 131 and the second external electrode 132 are supplied with voltages of different polarities, and are electrically connected to exposed portions of the first internal electrode layer 121 and the second internal electrode layer 122, respectively.

According to the above configuration, when a predetermined voltage is applied to the first external electrode 131 and the second external electrode 132, charges are accumulated between the first internal electrode layer 121 and the second internal electrode layer 122. At this time, a capacitance of the multilayered capacitor 100 is proportional to an overlapping area of the first internal electrode layer 121 and the second internal electrode layer 122 overlapping each other along the Z direction in the active region.

The first external electrode 131 and the second external electrode 132 may respectively include a first connection portion and a second connection portion disposed on the third surface and the fourth surface of the capacitor body 110 and connected to the first internal electrode layer 121 and the second internal electrode layer 122, and may also include a first band portion and a second band portion disposed at each corner where the first surface and the second surface of the capacitor body 110 and the third surface and the fourth surface thereof meet.

The first band portion and the second band portion may extend from the first connection portion and the second connection portion to portions of the first surface and second surface of the capacitor body 110, respectively. The first band portion and the second band portion may respectively further extend from the first connection portion and the second connection portion to the portions of the fifth surface and the sixth surface of the capacitor body 110. The first band portion and the second band portion may serve to improve adhesion strength of the first external electrode 131 and the second external electrode 132.

For example, the first external electrode 131 and the second external electrode 132 may respectively include a first base electrode and a second base electrode in contact with the capacitor body 110, a first intermediate electrode and a second intermediate electrode configured to cover the first base electrode and the second base electrode, and a first surface electrode and a second surface electrode configured to cover the first intermediate electrode and the second intermediate electrode.

The first base electrode and the second base electrode may include copper (Cu). In addition, the first base electrode and the second base electrode may include copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass.

For example, the first base electrode and the second base electrode may be formed in a method of dipping the capacitor body 110 in a conductive paste including a conductive metal and glass, printing the conductive paste on the surface of the capacitor body 110 through screen printing, gravure printing, or the like, and applying the conductive paste onto the surface of the capacitor body 110 or transferring a dry film formed by drying the conductive paste onto the capacitor body 110.

The first base electrode and the second base electrode are formed of the aforementioned conductive paste and thus may increase density of the first external electrode 131 and the second external electrode 132 due to the glass added thereto as well as maintain sufficient conductivity, and thereby effectively suppress penetration of a plating solution and/or external moisture.

For example, the glass component included in the first base electrode and the second base electrode may have a composition in which oxides are mixed, and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

The first intermediate electrode and the second intermediate electrode may be formed on the first base electrode and the second base electrode and completely cover the first base electrode and the second base electrode.

The first intermediate electrode and the second intermediate electrode may include a base resin and a conductive metal including copper (Cu), silver (Ag), nickel (Ni), or a mixture thereof.

The base resin included in the first intermediate electrode and the second intermediate electrode is not particularly limited as long as it has bondability and impact absorption. The base resin may be mixed with the conductive metal powder to form a paste, and may include, for example, an epoxy resin.

The conductive metal included in the first intermediate electrode and the second intermediate electrode is not particularly limited as long as it is a material that can be electrically connected to the first base electrode and the second base electrode, and may include, for example, copper (Cu), silver (Ag), nickel (Ni), or a mixture thereof.

The first intermediate electrode and the second intermediate electrode extend to the first and second surfaces of the capacitor body 110. The length of the region where the first intermediate electrode and the second intermediate electrode are extended to the first and second surfaces of the capacitor body 110 may be longer than the length of the region where the first base electrode and the second base electrode are extended to the first and second surfaces of the capacitor body 110.

That is, the first intermediate electrode and the second intermediate electrode may be formed on the first base electrode and the second base electrode, respectively, and completely cover the first base electrode and the second base electrode.

For example, the first surface electrode and the second surface electrode may include nickel (Ni) as a main component, and may further include copper (Cu), tin (Sn), palladium (Pd), platinum (Pt), gold (Au), silver (Ag), tungsten (W), titanium (Ti), or lead (Pb) alone or as alloys thereof. The first surface electrode and the second surface electrode may improve mountability of the multilayered capacitor 100 on a board, structural reliability, external durability, heat resistance, and equivalent series resistance (ESR).

For example, the first surface electrode and the second surface electrode may be formed through plating. The first surface electrode and the second surface electrode may be formed through sputtering or electroplating (electric deposition).

Hereinafter, specific embodiments of the disclosure are presented.

However, the examples described below are only for specifically illustrating or explaining the disclosure, and the scope of the invention is not limited thereto.

Experiment Method

An additive prepared by selecting barium titanate (BaTiO$_3$, hereinafter, BT) synthesized in a solid-phase method as a base material and using Dy, Mn, and Si as subcomponents was used. Samples were prepared by performing firing under an equal sintering atmosphere (H$_2$, 0.7%) at an equal temperature. The samples with a different size of the base material were named as BT1 (250 nm to 350 nm), BT2 (150 nm to 250 nm), and BT3 (100 nm to 200 nm), the sizes in the curved bracket represent powder sizes of the base material. A temperature of the firing was changed from 1150° C. to 1250° C. (BT3-1 to BT3-4) to adjust a final dielectric grain size of BT3.

Experiment Results

BT, which is used as a dielectric material for a multilayered capacitor, has a final particle structure determined according to firing conditions and an additive, which have the greatest influence on grain crystallinity and core-shell formation. Above all, a BT grain has a core-shell structure in which the additive is partially dissolved in the crystal lattice of BT and thus may adjust a capacity variation rate and a dielectric constant according to a temperature. A portion called a core maintains a ferroelectric tetragonal crystal lattice, while a portion called a shell surrounding the core maintains a pseudocubic crystal lattice including the dissolved additive, wherein the core and the shell constitute the grain.

Under a DC voltage (DC bias) continuously applied to the dielectric material, degradation depends on oxygen activity and thus is caused by movement of charged defects. The core-shell structure of the dielectric grain, compared with pure BT, may have capacity changes due to a lower temperature, a lower dielectric loss, higher reliability, and lower conductivity of a dielectric layer. The reason is that a region with many dopants at a grain boundary hinders movement of oxygen vacancies.

Figure 5:
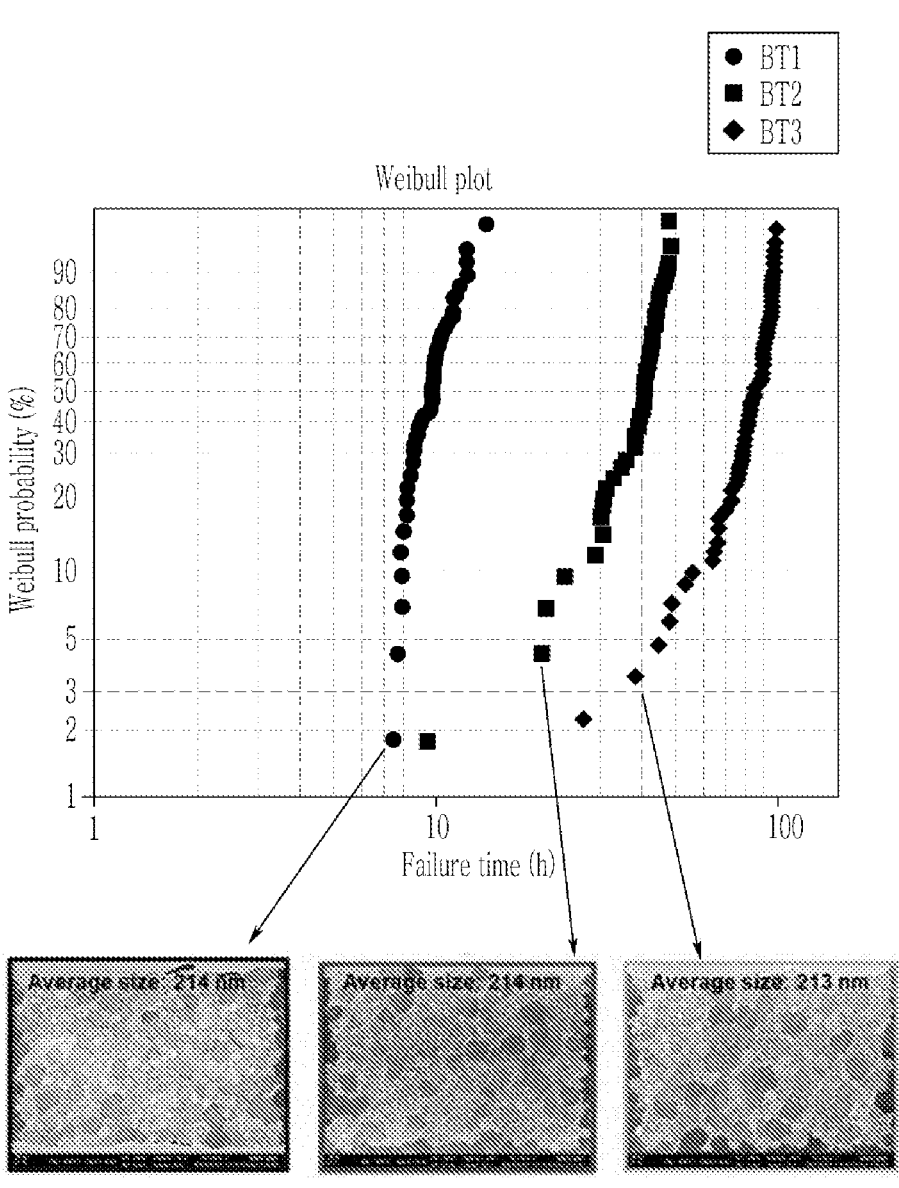
FIG. 5 is a Weibull plot graph illustrating HALT failure times of BT1, BT2, and BT3, and photographs showing the final dielectric microstructure and grain size distribution according to each base material.
Figure 6:
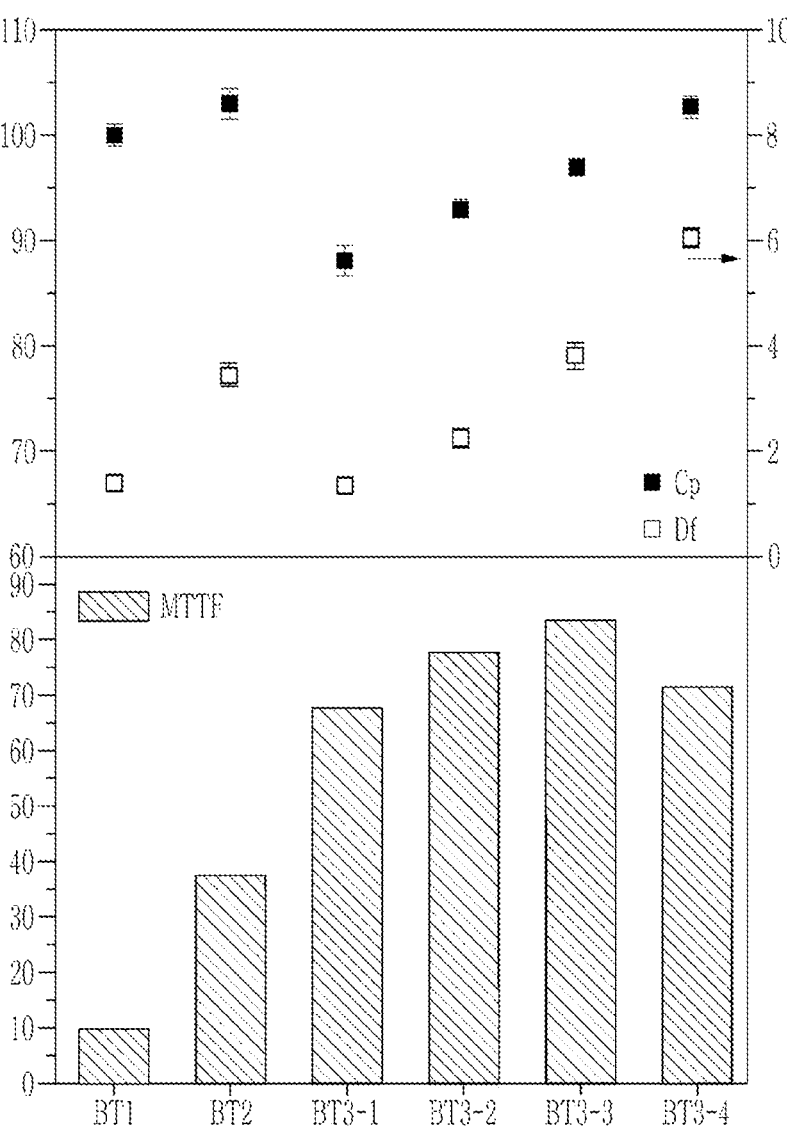
FIG. 6 is a graph showing capacities (Cp), DF, and MTTF of BT1, BT2, and BT3.

FIG. 5 is a Weibull plot graph illustrating HALT (Highly Accelerated Life Test) failure times of BT1, BT2, and BT3, and a photograph showing the final dielectric microstructure and grain size distribution according to each base material, and FIG. 6 is a graph showing capacities (Cp), DF (Dissipation Factor), and MTTF (Mean Time to Failure) of BT1, BT2, and BT3.

Referring to FIG. 5, as a result of confirming electrical characteristics of BT1, BT2, and BT3, MTTF in the highly accelerated life test (HALT, 170° C., applying 33 V/μm) are respectively 10 h, 37 h, and 83 h, which show that as the base material is reduced, BT3 is dominant.

Referring to FIG. 6, as for BT3, 1200° C. may be determined as an appropriate sintering temperature to secure appropriate capacity and DF. In addition, MTTF is recorded as the highest time at 1200° C. in the base material of 100 nm.

Three samples of BT1, BT2, and BT3-3 exhibited a similar average grain size (about 214 nm), wherein as a starting base material size was smaller, MTTF tended to increase. This result is difficult to directly interpret by conventional theory regarding a multilayered capacitor in which MTTF is correlated with the number of grains constituting a dielectric layer.

In addition, since the base material samples BT3-2 and BT3-3 with the same size respectively have an average grain size of 165 nm and 214 nm and MTTF of 78 h and 83 h, which are also difficult to explain by the conventional theory regarding the correlation between the number of grains and MTTF, material properties of the dielectric material need to be more focused, and in order to understand the material properties, it is necessary to understand a microstructure, a solid-dissolution degree of the additive, and electrical characteristics.

Furthermore, the base material shows a difference in grain growth behavior according to atomization of the base material. In the sintering, a driving force proceeds in a direction of reducing interface energy of a system and also reducing a free surface. Since particles have a different surface area according to a particle size, as the particle size is smaller, surface energy, which is the driving force in the sintering, increases, and kinetics of grain growth occur rapidly by diffusion.

As a result of examining a diffusion process of the additive to the powder surface of the base material, a multicore-shell mechanism of two or more cores in one grain is proposed. In addition, the multicore-shell is checked through SEM. Other methods and/or tools appreciated by one of ordinary skill in the art, even if not described in the present disclosure, may also be used.

Figures 7A, 7B, 7C, 7D, 7E, 7F:
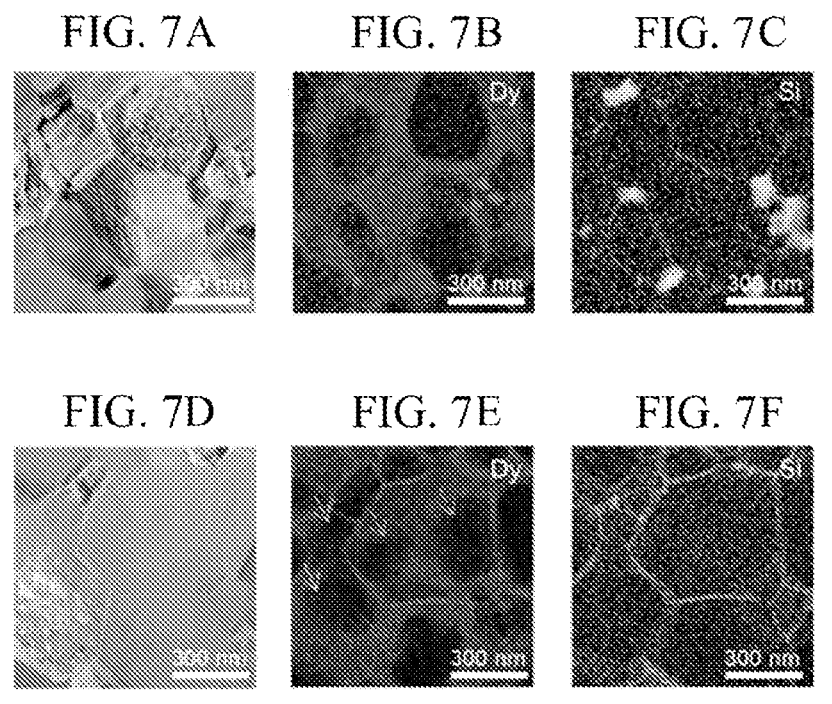

FIGS. 7A-7F show the final grain shape and component analysis results according to the size of raw BT powder, FIG. 7A is a high-angle annular dark-field imaging (HAADF) image of BT1, FIG. 7B is an EDS mapping of Dy of BT1, FIG. 7C is an EDS mapping of Si of BT1, FIG. 7D is a HAADF image of BT3, FIG. 7E is an EDS mapping of Dy of BT3, and FIG. 7F is an EDS mapping of Si of BT3.

Referring to FIGS. 7A to 7F, the base material may be distinguished through EDS (energy dispersive spectrometry) mapping depending on an element. The reason is that a doping degree varies depending on types of the element of the additive, so that an interface of a core and a grain boundary may be accurately defined.

Herein, dysprosium (Dy), one of the additive elements, is not diffused into the core (pure BaTiO$_3$) but exists in a shell and confirms a boundary with the core, and silicon (Si), which is used as a liquid sintering agent, is not diffused into BT due to low solid-dissolution of BT but exists at the grain boundary.

A conventional BT core-shell has one grain shape in which one core is surrounded with a shell. The grain growth behavior according to the atomization explains the mechanism of a multicore-shell structure of including several cores in one grain, which is distinguished from the previously published content.

In fine particles having a relatively large surface area, additives are diffused in a larger volume, and as the particles grow, the additives continuously diffuse onto shell interfaces in contact with other grains, wherein as a volume of the shells increases, Si on the interface of the particles is precipitated out of the grain interface, growing two core-shells into one grain.

These processes may be carried out in a temperature range where a material with a particle or an atomic unit has free mobility, and accordingly, since the smaller particle sizes, the higher surface energy and the more unstable the material, automized particles may outstandingly exhibit grain growth under the same temperature. Particles fused with each other form a grain with a multicore-shell through movement and rearrangement of each grain boundary, which requires a large energy expense, compared with formation of a grain with a multicore-shell, and also is inferred to have more defects (point defects, dislocation, and the like) to resolve coherency strain than the single core-shell. The formation process of the multicore-shell is presumed to consist of the movement of grain boundaries where shells between the particles contact or arrangement of atoms.

Figure 8:
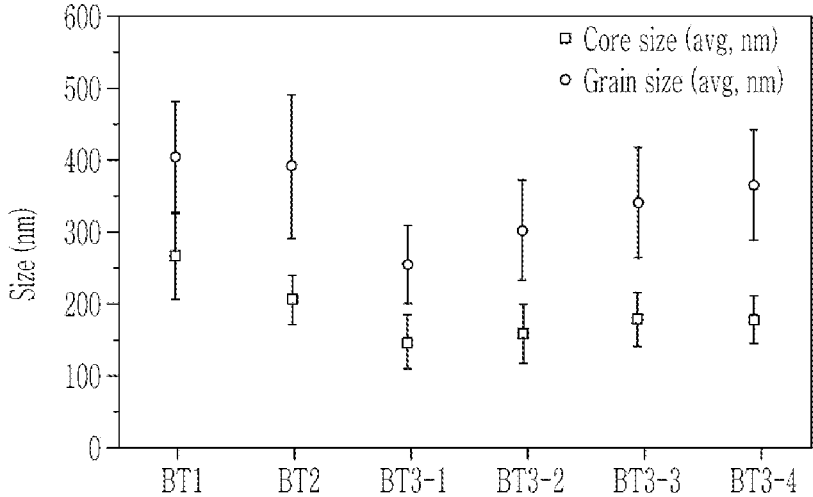
FIG. 8 is a schematic result of grain size and core size measured from SEM images according to samples (measurement parameters: 30).

FIG. 8 shows results of plotting grain sizes and core sizes which are measured from SEM images of the samples.

Referring to FIG. 8, as the grain sizes of the base materials decrease, the core sizes also decrease therewith. In addition, as for BT3 using a fine base material, as a sintering temperature increases, a grain size thereof increases, but a core size is maintained at a similar level.

As for BT1, as the grain size increases, the core size also tends to increase, and thereby, a shell grows at the same ratio (average shell volume ratio: 70.8%) as the grain size.

As for BT2 and BT3, which are relatively small, since the cores are similar, but a volume of the shells relatively increases, grains tend to grow.

For reference, BT2 exhibits an average shell volume ratio of 85.1%, BT3-1 exhibits an average shell volume ratio of 85.0%, BT3-2 exhibits an average shell volume ratio of 85.3%, BT3-3 exhibits an average shell volume ratio of 85.5%, and BT3-4 exhibits an average shell volume ratio of 88.2%.

In addition, BT3 maintains a core size according to a change of the sintering temperature (1150° C. to 1250° C.) but increased the grain size to twice or more of that of the core size, causing shell merging and leading to growing into a multicore-shell. As a result, with more atomization, a shell-to-core ratio in one grain increases, which may affect the electrical characteristics.

Figure 9:
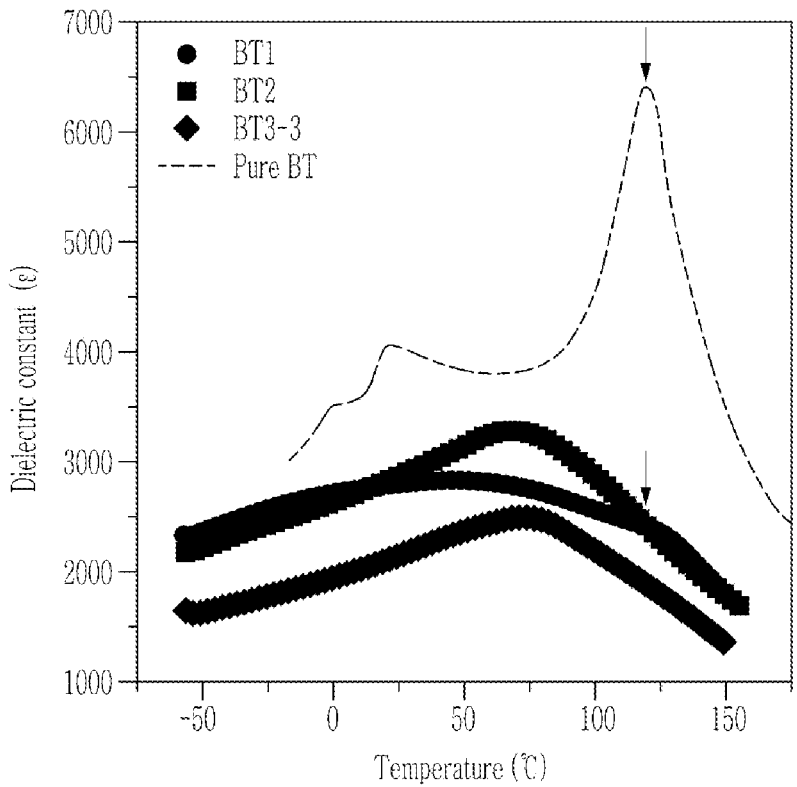
FIG. 9 is a graph showing dielectric constant characteristics according to a base material size and a temperature.
Figure 10:
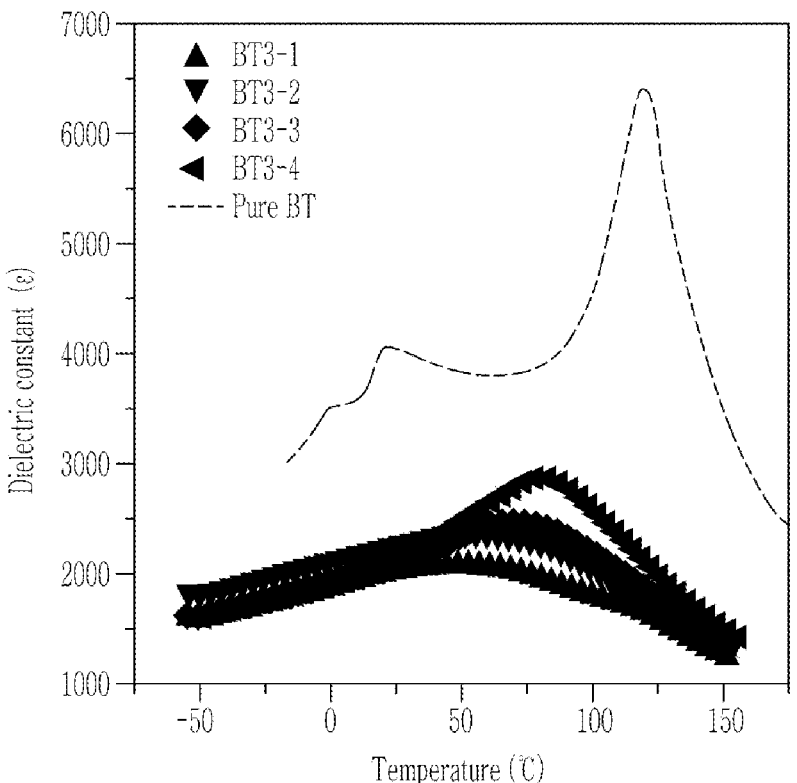
FIG. 10 is a graph showing dielectric constant characteristics according to a sintering temperature of BT3.

FIG. 9 is a graph showing dielectric constant characteristics according to a base material size and a temperature, and FIG. 10 is a graph showing dielectric constant characteristics according to a sintering temperature of BT3.

Referring to FIGS. 9 and 10, a graph showing dielectric constant characteristics according to a temperature exhibits characteristics of a bulk chip. Pure BT with a grain size of 330 nm or so has a distinct Curie temperature of 125° C., at which a phase transition occurs from a tetragonal phase to a cubic phase.

When an additive having Dy, Mn, and Si as subcomponents is used, a final product turns out to have a dielectric constant of 2200 to 2700 at room temperature.

BT1 has a relatively smaller core-to-shell volume ratio than the other samples when microstructure shapes are compared, and exhibits a dielectric constant variation rate varying according to a temperature, which is changed with reference to 125° C.

Compared therewith, BT2 and BT3 have each maximum dielectric constant of 3279 and 2500 at 70° C. When atomized, a core size decreases and a dielectric constant decreases, but as a shell is formed, a maximum dielectric constant moves to a low temperature.

BT2 has an inflection point where a dielectric constant variation rate changes according to a same temperature as pure BT, which shows that sensitivity to a phase transition temperature is blunted by the shell formation.

In order to identify a cause of reliability improvement due to atomization, impedance and a current behavior in a DC power source are checked.

Figure 11:
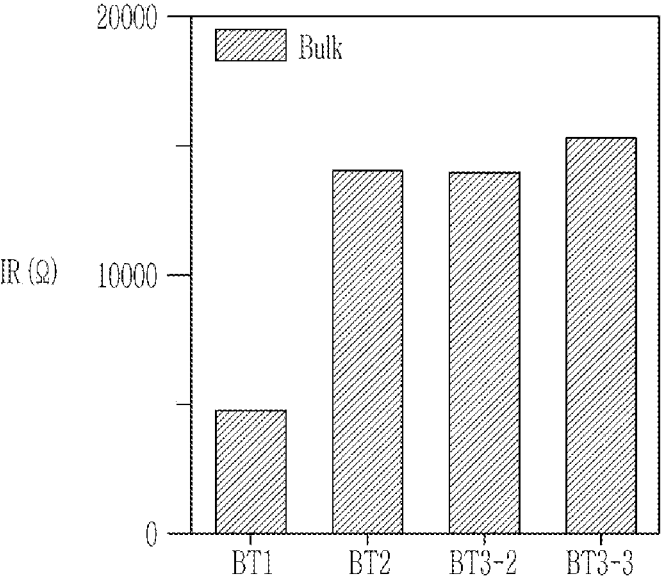
FIG. 11 is a graph showing impedance measurement results of bulk region resistance.
Figure 12:
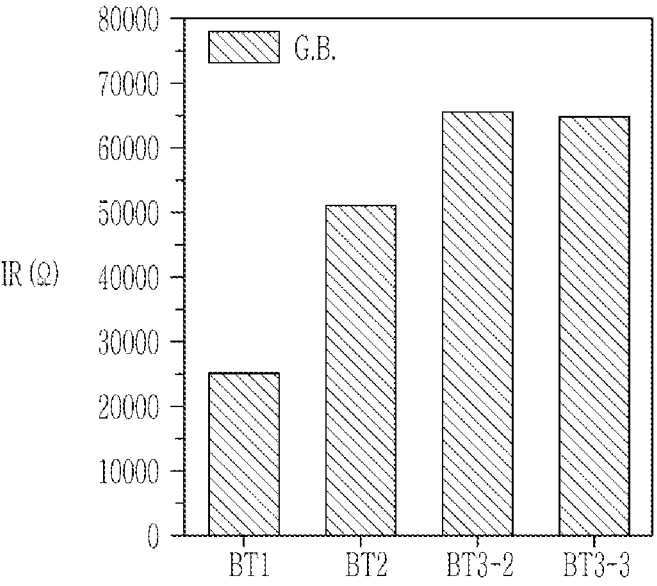
FIG. 12 is a graph showing impedance measurement results of grain boundary resistance.
Figure 13:
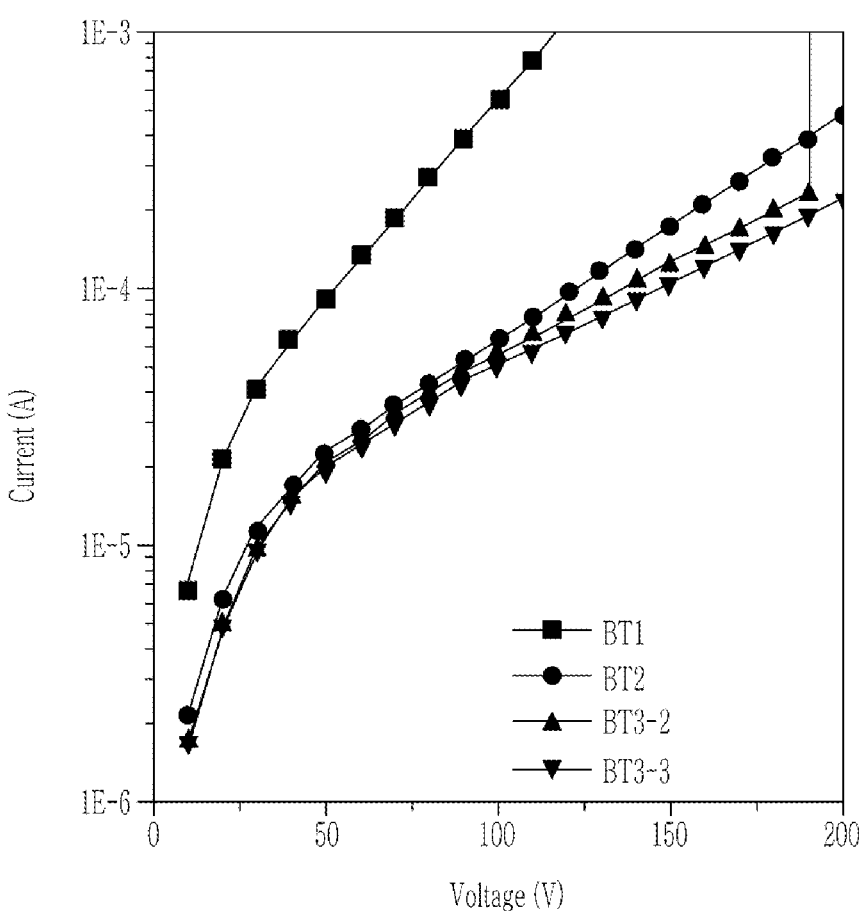
FIG. 13 is a graph showing IV curve measurement results according to BT (measurement temperature: 170° C.).

FIG. 11 is a graph showing the impedance measurement results of bulk region resistance, FIG. 12 is a graph showing impedance measurement results of grain boundary resistance, and FIG. 13 is a graph showing the IV curve measurement results according to BT (measurement temperature: 170° C.).

The impedance is fitted by setting two resistance components of bulk and grain boundary. BT1, BT2, BT3-2, and BT3-3 samples are selected to compare a size and a grain shape of the base material. First, as the size of the base material is smaller (BT1, BT2, and BT3), resistances of the bulk and the grain boundary sharply increase.

As for BT2 and BT3, the resistance of the grain boundary increases. As for BT3, a sample prepared at a different sintering temperature to compare a multicore-shell with a single core-shell is selected, but as the size of the base material by using the average grain size calculated earlier is smaller, resistance components of the bulk (core and shell) and the grain boundary increase.

As the sintering temperature increases, the shell volume relatively increases, thereby increasing resistance of the bulk, while slightly decreasing that of the grain boundary. As expected in FIG. 11, this result is interpreted as an increase in the resistance of the bulk due to an increase in the resistance components.

Closely looking at the I-V curve results measured at 170° C. which is the same temperature condition as HALT, as the size of the base material decreases, a leakage current decreases. The reason is that an insulator under a DC electric field may be related to an increase in resistance. When the base material is atomized, which is correlated with an effect of the resistance measured in the impedance, as resistance of the grain boundary increases, the leakage current relatively decreases, when a voltage is increased.

In addition, the correlation between degree of degradation and failure life-span, which is predicted from HALT, may also be observed.

Resultantly, in order to guarantee high reliability products, life-span improvement is confirmed through atomization of the base material BT. However, since an average grain size in a microstructure is similar, the atomization is difficult to directly corelate to MTTF through the number of grains in a dielectric layer. However, this may be explained in the atomization of BT by a microstructural difference due to coexistence of multicore-shells with conventional single core-shells. In addition, the effect of improving reliability in the accelerated life test may also be confirmed by the increase in the resistance components, which increases in an energy barrier in one grain.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:
a capacitor body including a dielectric layer and internal electrodes, and
an external electrode outside the capacitor body,
wherein the dielectric layer includes a plurality of dielectric grains, at least one of the plurality of dielectric grains has a multicore-shell structure, the dielectric grain having the multicore-shell structure includes two or more cores and a shell surrounding at least some of the cores, and a ratio of a sum of average areas of the cores included in dielectric grains having the multicore-shell structure to a total average area of the dielectric grains having the multicore-shell structure is about 5% to about 30%.

2. The multilayered capacitor of claim 1, wherein the dielectric grain having the multicore-shell structure includes 2 to 5 cores.

3. The multilayered capacitor of claim 1, wherein an average area of dielectric grains having the multicore-shell structure per 0.5 μm×0.5 μm area of the dielectric layer is about 5% to about 100%.

4. The multilayered capacitor of claim 1, wherein an average number of dielectric grains having the multicore-shell structure per 0.5 μm×0.5 μm area of the dielectric layer is 1 to 10.

5. The multilayered capacitor of claim 1, wherein a ratio of an average diameter of one core included in the dielectric grain having the multicore-shell structure to an average diameter of the dielectric grain having the multicore-shell structure is about 5% to about 50%.

6. The multilayered capacitor of claim 1, wherein a ratio of an average area of the shell included in the dielectric grain having the multicore-shell structure to the total average area of the dielectric grain having the multicore-shell structure is about 50% to about 95%.

7. The multilayered capacitor of claim 1, wherein in dielectric grains having a multicore-shell structure, a ratio of the sum of average areas of the cores to an average area of the shell is about 0.5:9.5 to about 5:5.

8. The multilayered capacitor of claim 1, wherein at least one of the plurality of dielectric grains has a single core-shell structure, and the dielectric grain having the single core-shell structure includes one core and a shell surrounding at least a portion of the core.

9. The multilayered capacitor of claim 8, wherein an average diameter of dielectric grains having a single core-shell structure is about 100 nm to about 1000 nm, and an average diameter of the core included in dielectric grains having a single core-shell structure is about 50 nm to about 500 nm.

10. The multilayered capacitor of claim 8, wherein an average diameter of dielectric grains having a multicore-shell structure is about 100 nm to about 1000 nm, and an average diameter of one core included in dielectric grains having a multicore-shell structure is about 50 nm to about 300 nm.

11. The multilayered capacitor of claim 8, wherein a ratio of an average diameter of the core included in dielectric grains having the single core-shell structure to an average diameter of the dielectric grains having the single core-shell structure is about 30% to about 80%.

12. The multilayered capacitor of claim 8, wherein a ratio of an average area of the shell included in dielectric grains having the single core-shell structure to a total average area of dielectric grains having the single core-shell structure is about 20% to about 70%.

13. The multilayered capacitor of claim 1, wherein the dielectric grains include:

a main component including a dielectric material, and a subcomponent, and the cores and the shell have different molar ratios of the main component and the subcomponent.

14. The multilayered capacitor of claim 13, wherein the cores include less than or equal to about 0.1 parts by mole of the subcomponent relative to 100.0 parts by mole of the main component, and the shell includes greater than about 0.1 parts by mole and less than or equal to about 30.0 parts by mole of the subcomponent relative to 100.0 parts by mole of the main component.

15. The multilayered capacitor of claim 13, wherein the main component includes $Ba_m TiO_3$ ($0.995 \leq m \leq 1.010$), $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $0 \leq x \leq 0.10$), $(Ba_{1-x}Ca_x)_m(Ti_{1-y}Sn_y)O_3$ ($0.995 \leq m \leq 1.010$, $0 \leq x \leq 0.10$, $0 < y \leq 0.20$), or a combination thereof.

16. The multilayered capacitor of claim 13, wherein the subcomponent includes manganese (Mn), chromium (Cr), barium (Ba), silicon (Si), aluminum (Al), magnesium (Mg), zirconium (Zr), or a combination thereof.

17. The multilayered capacitor of claim 16, wherein the subcomponent further includes lanthanum (La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or a combination thereof.

18. The multilayered capacitor of claim 1, wherein a ratio of an average diameter of one core included in the dielectric grain having the multicore-shell structure to an average diameter of the dielectric grain having the multicore-shell structure is about 12.8% to about 46.6%.

19. The multilayered capacitor of claim 13, wherein the subcomponent includes silicon (Si).

* * * * *